US011995946B2

(12) United States Patent
Gupta

(10) Patent No.: US 11,995,946 B2
(45) **Date of Patent: *May 28, 2024**

(54) GAMES AWARDING PRIZES DISPLAYED IN WINNING SYMBOL POSITIONS

(71) Applicant: Aristocrat Technologies Australia Pty Limited, North Ryde (AU)

(72) Inventor: Lipi Gupta, Newington (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/990,465

(22) Filed: Nov. 18, 2022

(65) Prior Publication Data

US 2023/0077685 A1 Mar. 16, 2023

Related U.S. Application Data

(63) Continuation of application No. 17/108,995, filed on Dec. 1, 2020, now Pat. No. 11,508,205, which is a continuation of application No. 16/101,163, filed on Aug. 10, 2018, now Pat. No. 10,872,491.

(30) Foreign Application Priority Data

Aug. 11, 2017 (AU) ................................ 2017903224

(51) Int. Cl.
*G07F 17/32* (2006.01)

(52) U.S. Cl.
CPC ...... *G07F 17/3213* (2013.01); *G07F 17/3267* (2013.01); *G07F 17/3209* (2013.01); *G07F 17/3239* (2013.01); *G07F 17/3248* (2013.01)

(58) Field of Classification Search
CPC ............. G07F 17/3267; G07F 17/3213; G07F 17/3248; G07F 17/3239; G07F 17/3209
USPC ...................................................... 463/16–20
See application file for complete search history.

(56) References Cited

U.S. PATENT DOCUMENTS

| | | | |
|---|---|---|---|
| 6,347,996 | B1 | 2/2002 | Gilmore |
| 6,793,577 | B1 | 9/2004 | Wilkins |
| 7,033,272 | B1 | 4/2006 | Mason |
| 7,704,141 | B1 | 4/2010 | Marks |
| 8,287,364 | B2 | 10/2012 | Caputo |
| 8,684,808 | B2 | 4/2014 | Aoki |
| 8,814,654 | B2 | 8/2014 | Hoffman |
| 9,087,434 | B2 | 7/2015 | Schwerdling |
| 2006/0058097 | A1 | 3/2006 | Berman |
| 2006/0128465 | A1 | 6/2006 | Schultz |
| 2007/0149267 | A1 | 6/2007 | Ross |

(Continued)

FOREIGN PATENT DOCUMENTS

AU 2018204501 2/2019

OTHER PUBLICATIONS

Australian Examination Report No. 1 issued in App. No. AU2022200556, dated Feb. 22, 2023, 3 pages.

(Continued)

*Primary Examiner* — Michael A Cuff
(74) *Attorney, Agent, or Firm* — McAndrews, Held & Malloy, Ltd.

(57) ABSTRACT

A gaming system selects a plurality of base symbols for display. When a winning symbol combination exists in the base symbols selected, and the winning symbol combination includes a defined base symbol, the gaming system selects a bonus symbol for display that is disposed over the defined base symbol.

20 Claims, 9 Drawing Sheets

(56) References Cited

U.S. PATENT DOCUMENTS

| | | | |
|---|---|---|---|
| 2008/0102921 | A1 | 5/2008 | Urquhart |
| 2008/0274788 | A1 | 11/2008 | Wilson |
| 2009/0061984 | A1 | 3/2009 | Yi |
| 2009/0186682 | A1 | 7/2009 | Kim |
| 2010/0029364 | A1 | 2/2010 | Zielinski |
| 2013/0017881 | A1 | 1/2013 | Watkins |
| 2013/0237307 | A1 | 9/2013 | Wotton |
| 2014/0194183 | A1 | 7/2014 | Pierer |
| 2014/0342798 | A1 | 11/2014 | Fujisawa |
| 2015/0065224 | A1 | 3/2015 | Aoki |
| 2015/0170462 | A1 | 6/2015 | Berman |
| 2016/0110943 | A1 | 4/2016 | Nicely |
| 2017/0124799 | A1 | 5/2017 | Berman |
| 2018/0130304 | A1 | 5/2018 | Berman |
| 2018/0130308 | A1 | 5/2018 | Berman |
| 2018/0285910 | A1 | 10/2018 | De Kleijn |
| 2018/0357861 | A1 | 12/2018 | Cormack |
| 2019/0188966 | A1 | 6/2019 | Chan |

OTHER PUBLICATIONS

Notice of Allowance dated Aug. 26, 2020 for U.S. Appl. No. 16/101,163 (pp. 1-8).

Australian Examination Report No. 1 for App. No. AU2019279947, dated Jan. 28, 2021, 6 pages.

Office Action (Non-Final Rejection) dated Mar. 24, 2022 for U.S. Appl. No. 17/108,995 (pp. 1-6).

Office Action (Notice of Allowance and Fees Due (PTOL-85)) dated Jul. 25, 2022 for U.S. Appl. No. 17/108,995 (pp. 1-5).

GAMES AWARDING PRIZES DISPLAYED IN WINNING SYMBOL POSITIONS

RELATED APPLICATION(S)

The present application is a continuation of and claims priority to U.S. patent application Ser. No. 17/108,995, filed Dec. 1, 2020, and entitled "Games Awarding Prizes Displayed in Winning Symbol Positions," which is a continuation of and claims priority to U.S. patent application Ser. No. 16/101,163, filed Aug. 10, 2018, and entitled "Games Awarding Prizes Displayed in Winning Symbol Positions," issued on Dec. 22, 2020, as U.S. Pat. No. 10,872,491, which claims priority to Australian Patent Application No. AU2017903324, having a filing date of Aug. 11, 2017, which are hereby incorporated by reference in their entireties.

BACKGROUND

The present invention relates to a gaming system and to a method of gaming.

It is known to provide a gaming system arranged to randomly display several symbols from a predetermined set of symbols and to determine a game outcome such as a game win based on the displayed symbols.

Such gaming systems may commonly be implemented as a stepper machine provided with reels with each reel carrying several symbols of the set, or a video machine wherein selected symbols are displayed on virtual reels on a graphical display device.

SUMMARY

In accordance with a first aspect of the present disclosure, there is provided a gaming system comprising: a symbol selector arranged to select a plurality of base symbols from a set of base symbols for display in a plurality of display position groups, each display position group comprising a plurality of display positions; and an outcome evaluator arranged to determine whether the displayed symbols define a winning symbol combination; wherein when the selected plurality of base symbols includes at least one defined base symbol and a winning symbol combination exists, the system is arranged to select at least one bonus symbol and display each selected at least one bonus symbol at a display position that includes a defined base symbol; and the system further comprising a prize allocator arranged to allocate a prize when a winning symbol combination exists, the prize dependent on the winning combination and the selected at least one bonus symbol.

In an embodiment, the system is arranged to select at least one bonus symbol and to display the selected at least one bonus symbol at a display position that includes the defined base symbol when the winning symbol combination includes the defined base symbol.

In an embodiment, at least one of the bonus symbols is a spot prize bonus symbol indicative of a spot prize. Each spot prize bonus symbol may be indicative of a defined number of credits.

In an embodiment, at least one of the bonus symbols is a prize multiplier bonus symbol indicative of a prize multiplier, wherein when the selected prize multiplier bonus symbol is displayed at a display position that includes the defined base symbol, a prize awarded for a winning outcome is multiplied.

In an embodiment, selection of the at least one bonus symbol is communicated to a player by displaying bonus symbols in an at least semi-transparent reel.

In an embodiment, the system is arranged to display a bonus symbol at each display position.

In an embodiment, the at least one selected bonus symbol is selected using a random weighting table.

In an embodiment, the system includes a symbol expander arranged to cause all base symbols in a display position groups to be replaced by special symbols if the selected plurality of base symbols includes a defined base symbol in the display position groups.

In an embodiment, the symbol expander is arranged to cause all base symbols that are to be displayed in a display position group to be replaced by special symbols before the base symbols are displayed if the special symbol determiner determines that a special symbol will be displayed in a display position in the display position group when the base symbols are displayed.

In an embodiment, the system also includes a symbol replicator arranged to cause replication of special symbols from a first display position group to a second display position group so that the first and second display position groups display only special symbols. The first display position group may be pre-defined, determined according to location of a special symbol in a selected base symbol outcome, selected pseudo-randomly or selected based on defined criteria. The second display position group may be pre-defined, selected pseudo-randomly or selected based on defined criteria.

In an embodiment, when the selected plurality of base symbols includes a plurality of defined base symbols and a winning symbol combination exists, the system is arranged to select a plurality of bonus symbols and to display the selected plurality of bonus symbols at display positions that include the selected defined base symbols.

In an embodiment, the defined base symbol is a WILD symbol.

Each display position group may be associated with a reel having a plurality of display positions.

In accordance with a second aspect of the present disclosure, there is provided a method of playing a game comprising: selecting a plurality of base symbols from a set of base symbols for display in a plurality of display position groups, each display position group comprising a plurality of display positions; determining whether the displayed symbols define a winning symbol combination; when the selected plurality of base symbols includes at least one defined base symbol and a winning symbol combination exists, selecting at least one bonus symbol and displaying each selected at least one bonus symbol at a display position that includes a defined base symbol; and allocate a prize when a winning symbol combination exists, the prize dependent on the winning combination and the selected at least one bonus symbol.

In accordance with a third aspect of the present disclosure there is provided a computer program arranged when loaded into a computer to instruct the computer to operate in accordance with the gaming system of the first aspect.

In accordance with a fourth aspect of the present disclosure, there is provided a computer readable medium having a computer readable program code embodied therein for causing a computer to operate in accordance with the gaming system of the first aspect.

In accordance with a fifth aspect of the present disclosure, there is provided a data signal having a computer readable program code embodied therein to cause a computer to operate in accordance with the gaming system of the first aspect.

BRIEF DESCRIPTION OF THE DRAWINGS

In order that the present disclosure may be more clearly ascertained, embodiments of the present disclosure will now be described, by way of example only, with reference to the accompanying drawings, in which.

DETAILED DESCRIPTION

Figure 1:
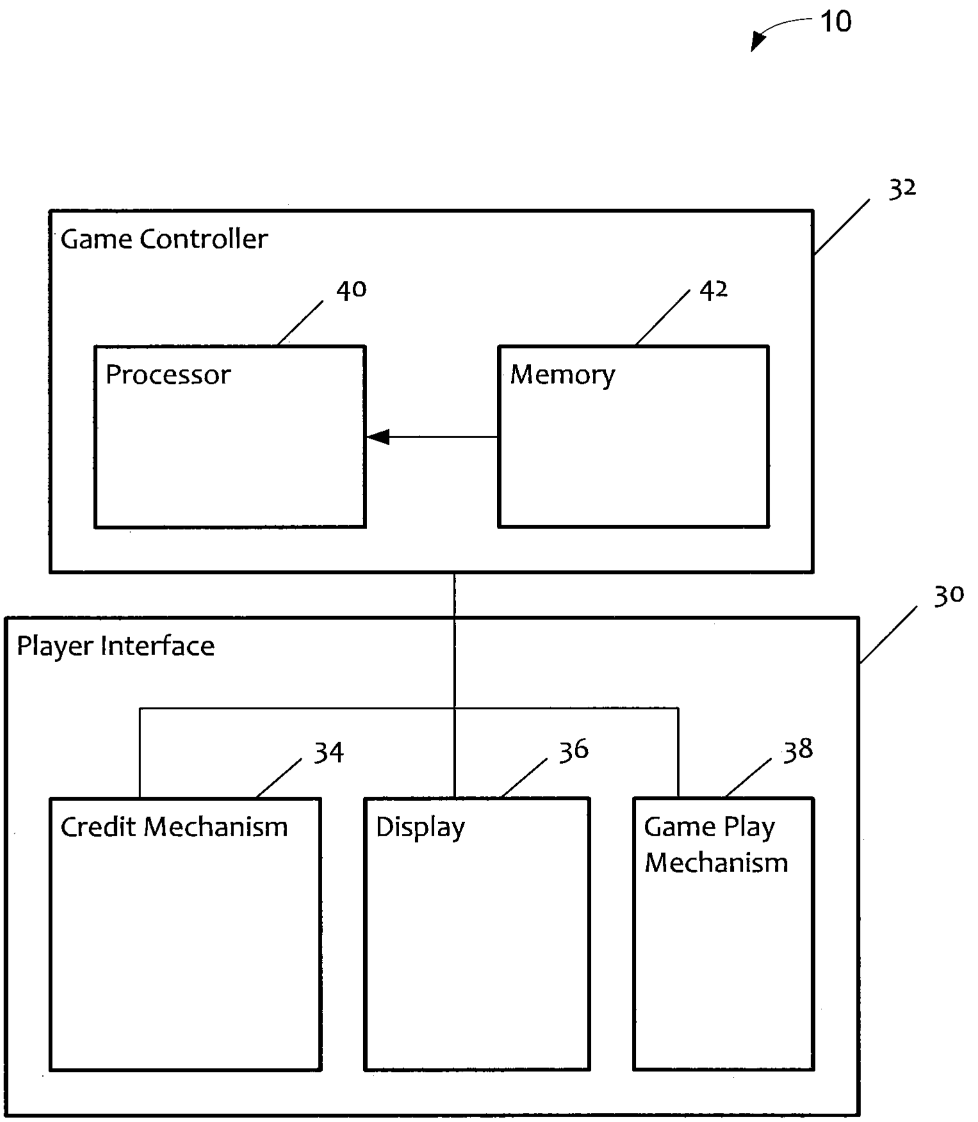
FIG. 1 is a schematic block diagram of components of a gaming system in accordance with an embodiment of the present disclosure.

The present gaming system operates such that during game play, a plurality of base symbols are randomly selected from a set of base symbols and displayed in a corresponding plurality of display position groups, each of which comprises a plurality of display positions. The base symbols shown at the display positions are used to determine game outcomes by comparing the displayed base symbols with defined winning combinations.

In one type of gaming machine, a display area including 15 display positions is presented to a player with each display position including one base symbol. The display positions are arranged in five vertically disposed reels, with each reel corresponding to a display position group, and each reel having three visible display positions. After the reels are spun and subsequently stopped, the display positions show a random selection of base symbols.

Generally, with such games, a plurality of win patterns in the form of win lines are defined which extend across the reels and include one display position from each reel. Typically the base symbols that are disposed in a win line are compared with winning symbol combinations defined in a pay table so as to determine whether a player of the game should receive an award. For example, if winning symbol combinations are based on poker hands, a particular prize would be awarded if the win line comprises four aces. Other winning symbol combinations and corresponding prizes may also be defined.

Such a game often comprises normal game mode and special game mode. During normal game mode, the displayed base symbols are compared with winning combinations defined in a pay table.

With the present system, during special game mode, the gaming system is arranged so that when a winning base symbol combination exists, the system selects at least one bonus symbol and displays the selected bonus symbol(s) at respective display position(s). The system then allocates a prize that is dependent on the winning combination and the bonus symbol(s) that are displayed at display positions corresponding to a defined base symbol.

For example, the defined base symbol may be a WILD symbol, and when a winning combination exists, a bonus symbol is selected for display at the WILD symbol display position, with the prize allocated being at least partly dependent on the displayed bonus symbol. The bonus symbol may be indicative of a spot credit award, a prize multiplier, or any suitable spot bonus prize or prize that influences the prize awarded for the winning combination.

In an embodiment, the bonus symbol is selected and used to at least partly determine the awarded prize only when a defined base symbol appears in a winning combination.

Referring to the drawings, there is shown a schematic block diagram of a gaming system 10 arranged to implement a probabilistic game of the type wherein several base symbols from a set of base symbols are randomly displayed, and a game outcome is determined on the basis of the displayed base symbols. The system is of the type including multiple game modes, such as being operable in normal game mode wherein a base game is implemented and special game mode wherein a feature game is implemented.

With some such probabilistic games, the set of base symbols used during normal game mode include standard symbols and function symbols, and the game outcome is determined on the basis of the displayed standard symbols and the function associated with any displayed function symbol. For example, standard symbols may resemble fruit such as apples, pears and bananas with a win outcome being determined when a predetermined number of the same fruit appear on a display along a win line, or are displayed according to defined outcome patterns such as scattered, and so on. The function associated with a function symbol may be for example a wild function wherein display of the function symbol is treated during consideration of the game outcome as any of the standard symbols. A function symbol may be represented as the word "WILD", a star, or by any other suitable word or symbol. Other functions are also envisaged such as scatter functions, multiplier functions, repeat win functions, jackpot functions and feature commencement functions.

Referring to FIG. 1, a schematic diagram of components of a gaming system 10 in accordance with the present embodiment is shown. The components comprise a player interface 30 and a game controller 32. The player interface 30 is arranged to enable interaction between a player and the gaming system and for this purpose includes input/output components required for the player to enter instructions and play the game.

Components of the player interface 30 may vary but will typically include a credit mechanism 34 to enable a player to input credits and receive payouts, one or more displays 36 which may comprise a touch screen, and a game play mechanism 38 arranged to enable a player to input game play instructions.

The game controller 32 is in data communication with the player interface 30 and typically includes a processor 40 arranged to process game play instructions and output game player outcomes to the display 36. Typically, the game play instructions are stored as program code in a memory device 42 that can also be hardwired. It will be understood that in this specification the term “processor” is used to refer generically to any device that can process game play instructions and may include a microprocessor, microcontroller, programmable logic device or other computational device such as a personal computer or a server.

Figure 2:
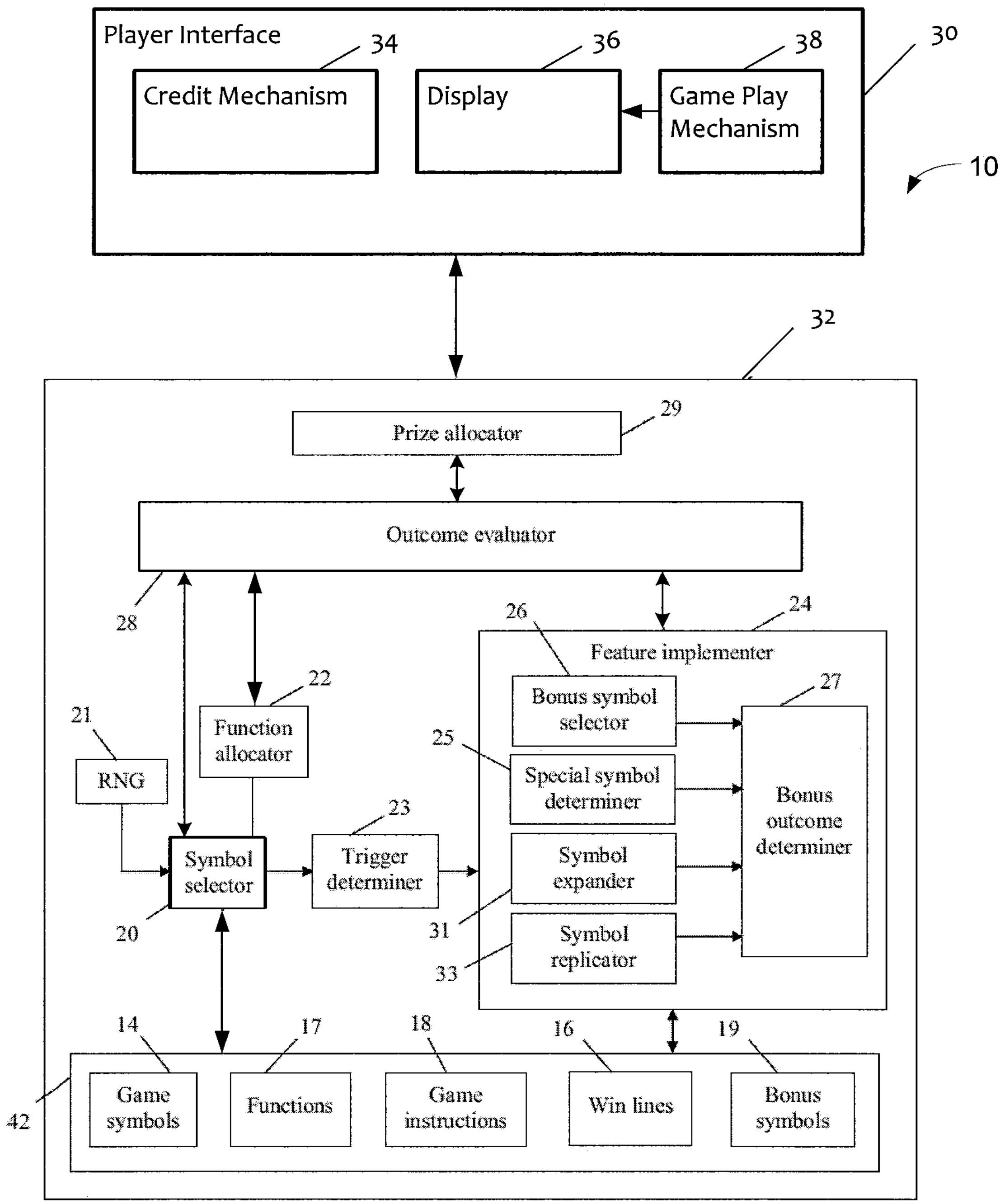
FIG. 2 is a schematic block diagram of functional components of a gaming system in accordance with an embodiment of the present disclosure.

A functional diagram illustrating operative components of the game controller 32 is shown in FIG. 2.

The memory device 42 is arranged to store data indicative of a plurality of base symbols 14, in the present example associated with a plurality of reels, win lines data 16 indicative of available win lines, function data 17 indicative of functions applicable to function symbols, game instruction 18 indicative of game instructions usable by the gaming system 10 to control operation of the game, and bonus symbols data 19 indicative of bonus symbols that are indicative of a bonus prize when a bonus symbol appears at the same display position as a selected defined base symbol.

The game controller 32 includes a symbol selector 20 which is arranged to select several base symbols from the base symbols 14 available for display to a player in a plurality of display positions, in this example by spinning reels containing the symbols and stopping the reels so as to display at least one base symbol on each reel. In this example, the selection carried out by the symbol selector 20 is made using a random number generator 21.

It will be appreciated that the random number generator 21 may be of a type which is arranged to generate pseudo random numbers based on a seed number, and that in this specification the term “random” will be understood accordingly to mean truly random or pseudo random.

The game controller 32 also includes a function allocator 22 arranged to apply functions to displayed function symbols according to the functions allocated to the function symbols.

With the present embodiment, since a base game and a feature game are implemented, the game controller 32 also comprises a trigger determiner 23 arranged to determine whether a trigger condition exists and to commence a feature game when a trigger condition is determined to exist.

Such a trigger condition may be display of a particular symbol or combination of symbols, or any other suitable game trigger.

The game controller also comprises a feature implementer 24 arranged to implement a feature game when the feature game is triggered by the trigger determiner 23.

The feature implementer 24 includes a special symbol determiner 25 arranged to determine whether a “special” defined base symbol is present in a displayed outcome, for example displayed in a winning outcome. Such a special symbol may include a WILD symbol, or any other suitable defined symbol from the base symbols 14.

The feature implementer 24 also includes a bonus symbol selector 26 arranged to select a bonus symbol, for example for each displayed special symbol or each special symbol present in a winning outcome, the selected bonus symbol(s) being displayed at the same display position(s) as the special symbol(s). Selection of the bonus symbol(s) may be achieved in any suitable way, for example using a random weighting table, and may be communicated to a player in any suitable way, for example by displaying a “ghost reel” over the symbol display positions. Such a ghost reel may be at least semi-transparent and include a plurality of bonus symbols, each located so as to be disposed over a display position when the ghost reel stops rotating. In this way, when the ghost reel stops rotating, semi-transparent symbols are displayed over each of the display positions and therefore over the base symbols shown in the display positions. This provides a player with the ability to view the displayed base symbols whilst providing a clear indication as to the bonus symbol(s) displayed at respective display positions. However, it will be understood that selection and display of bonus symbols associated with the displayed special symbols may be achieved in any other suitable way.

In this example, the feature implementer 24 may also include a symbol expander 31 arranged to cause all base symbols that are to be displayed in a reel to be replaced by special symbols if the special symbol determiner 25 determines that a special symbol will be displayed in a display position on the reel when the reels stop rotating. In this way, if a reel will display a special symbol when it stops, the symbol expander 31 changes all symbols on the reel to special symbols prior to stopping the reels during a feature game. This increases the likelihood that a winning outcome will exist because more special symbols (in this example WILD symbols) will be displayed, and also increases the likelihood that additional prizes will be awarded, in this example based on coincident display at a display position of a special symbol and a bonus symbol.

In this example, the feature implementer 24 may also include a symbol replicator 33 arranged to cause replication of a reel containing special symbols to another reel so that 2 reels will contain only special symbols. The other reel may be pre-defined, selected pseudo-randomly or selected based on defined criteria.

For example, after expansion by the symbol expander 31 to include WILD symbols at each display position on the reel, a further reel may be modified so as to change all symbols on the further reel to WILD symbols. This further increases the likelihood that a winning outcome will exist because more special symbols (in this example WILD symbols) will be displayed, and also increases the likelihood that additional prizes will be awarded, in this example based on coincident display at a display position of a special symbol and a bonus symbol.

The feature implementer 24 also includes a bonus outcome determiner 27 arranged to determine an outcome in a feature game, in particular an outcome based on coincident display at a display position of a special symbol and a bonus symbol.

The game controller 32 also comprises an outcome evaluator 28 which, in accordance with game instructions 18, determines overall game outcomes based on the base symbols selected for display to the player by the symbol selector 20 and, during a feature game, by the bonus outcome determiner 27 based on base symbols displayed and bonus symbols displayed at display positions coincident with displayed special symbols.

The game controller 32 also comprises a prize allocator 29 arranged to allocate a determined prize to a player.

In this example, the gaming system is operable in normal game mode and special game mode.

During normal game mode, the outcome evaluator determines whether a winning combination of base symbols exists and a prize is awarded to a player for a winning symbol combination.

During special game mode, a feature game is implemented wherein the outcome evaluator determines whether a winning combination of base symbols exists, in this example that includes a special symbol, and a prize is awarded to a player for a winning base symbol combination and according to the bonus symbol(s) displayed at the same location(s) as the special symbol(s).

In the embodiment described below, a symbol selector 20, a function allocator 22, a trigger determiner 23, a symbol modifier (not shown), a special symbol determiner 25, a bonus symbol selector 26, a bonus outcome determiner 27, an outcome evaluator 28, a prize allocator 29, a symbol expander 31 and a symbol replicator 33 are at least partly implemented using the processor 40 and associated software although it will be understood that other implementations are envisaged.

The gaming system 10 can take a number of different forms.

In a first form, a player operable gaming device in the form of a stand alone gaming machine is provided wherein all or most components required for implementing the game are present in the gaming machine.

In a second form, a distributed architecture is provided wherein some of the components required for implementing the game are present in a player operable gaming device and some of the components required for implementing the game are located remotely relative to the gaming device. For example, a “thick client” architecture may be used wherein part of the game is executed on a player operable gaming terminal and part of the game is executed remotely, such as by a gaming server; or a “thin client” architecture may be used wherein most of the game is executed remotely such as by a gaming server and a player operable gaming terminal is used only to display audible and/or visible gaming information to the player and receive gaming inputs from the player.

However, it will be understood that other arrangements are envisaged. For example, an architecture may be provided wherein a gaming device is networked to a device server and the respective functions of the gaming machine and the gaming server are selectively modifiable. For example, the gaming system may operate in standalone gaming machine mode, “thick client” mode or “thin client” mode depending on the game being played, operating conditions, and so on. Other variations will be apparent to persons skilled in the art.

Figure 3:
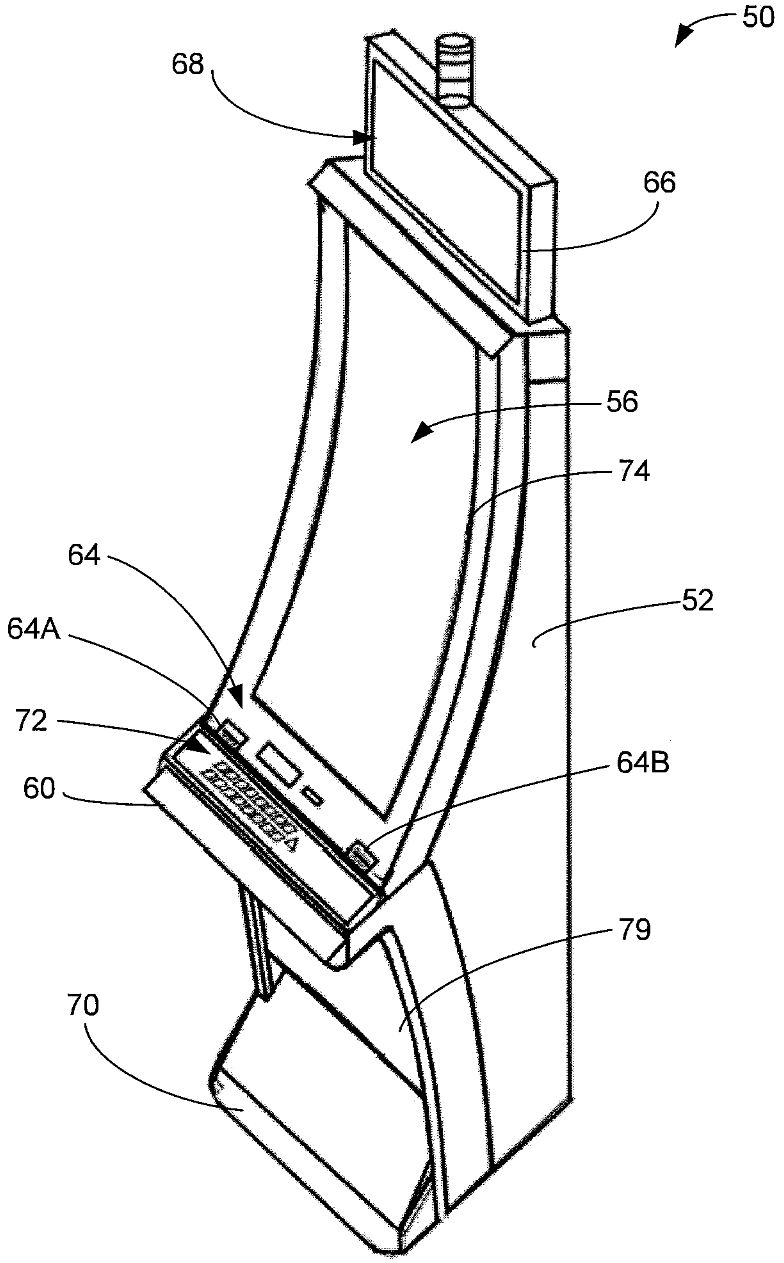
FIG. 3 is a diagrammatic representation of a gaming system in accordance with an embodiment of the present disclosure with the gaming system implemented in the form of a standalone gaming machine.

A gaming system in the form of a standalone gaming machine 50 is illustrated in FIG. 3. The gaming machine 50 includes a console 52 having a display 54 on which is displayed representations of a game 56 that can be played by a player. A mid-trim 60 of the gaming machine 50 houses a bank of buttons 62 for enabling a player to interact with the gaming machine, in particular during gameplay. The mid-trim 60 also houses a credit input mechanism 64 which in this example includes a coin input chute 64A and a bill collector 64B. Other credit input mechanisms may also be employed, for example, a card reader for reading a smart card, debit card or credit card.

A top box 66 may carry artwork 68, including for example pay tables and details of bonus awards and other information or images relating to the game. Further artwork and/or information may be provided on a front panel 69 of the console 52. A coin tray 70 is mounted beneath the front panel 69 for dispensing cash payouts from the gaming machine 50.

The display 54 is in the form of a video display unit, particularly a cathode ray tube screen device. Alternatively, the display 54 may be a liquid crystal display, plasma screen, or any other suitable video display unit. The top box 66 may also include a display, for example a video display unit, which may be of the same type as the display 54, or of a different type. The display 54 may comprise a touch screen usable by a player to interact with the gaming machine, in particular during game play.

The display 54 in this example is arranged to display representations of several reels, each reel of which has several associated symbols. Typically 3, 4 or 5 reels are provided. During operation of the game, the reels first appear to rotate then stop with typically three symbols visible on each reel. Game outcomes are determined on the basis of the visible symbols together with any special functions associated with the symbols.

A player marketing module (PMM) 72 having a display 74 is connected to the gaming machine 50. The main purpose of the PMM 72 is to allow the player to interact with a player loyalty system. The PMM has a magnetic card reader for the purpose of reading a player tracking device, for example as part of a loyalty program. However other reading devices may be employed and the player tracking device may be in the form of a card, flash drive or any other portable storage medium capable of being read by the reading device. In this example, the PMM 72 is a Sentinel III device produced by Aristocrat Technologies Pty Ltd.

Figure 4:
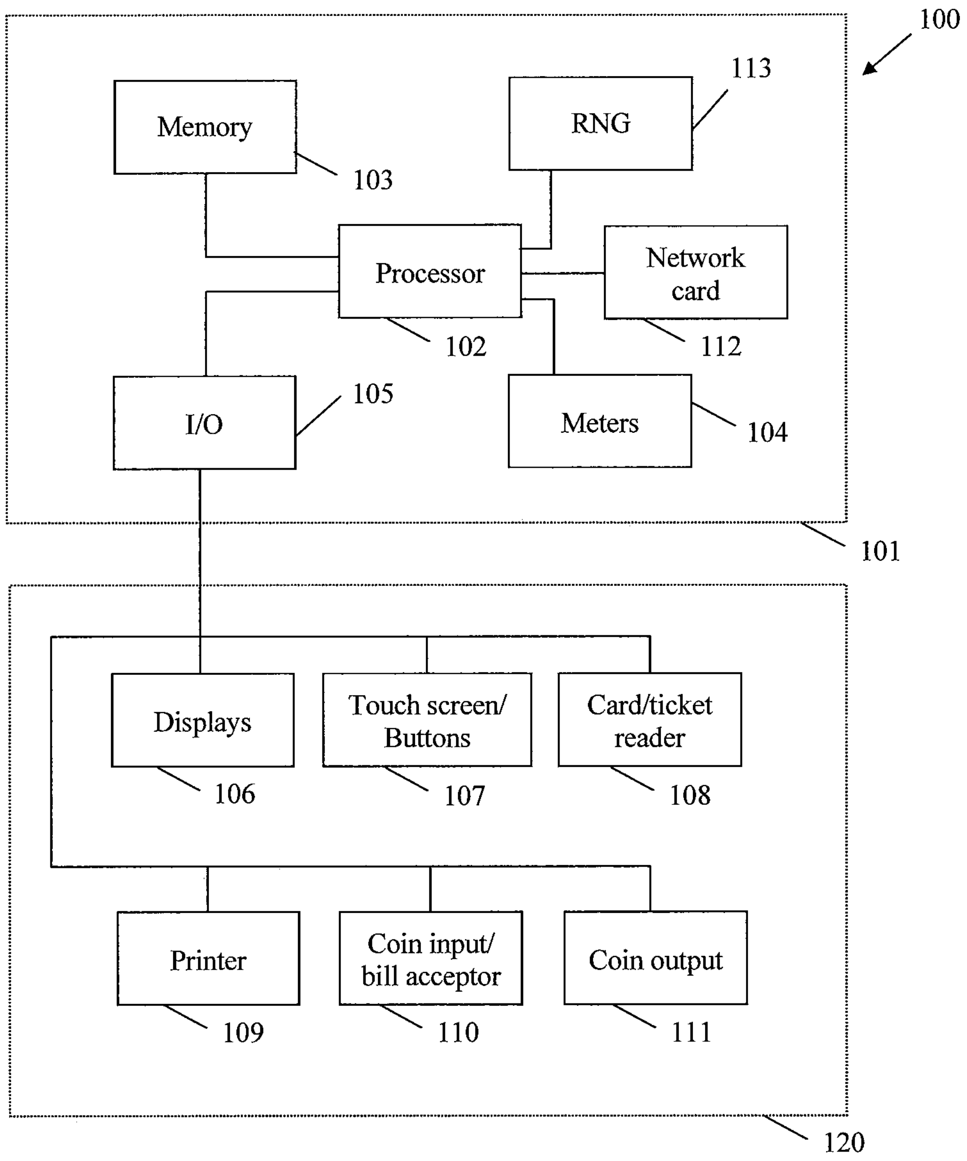
FIG. 4 is a schematic block diagram of operative components of the gaming machine shown in FIG. 3.

FIG. 4 shows a block diagram of operative components of a gaming machine 100 which may be the same as or different to the gaming machine shown in FIG. 3.

The gaming machine 100 includes a game controller 101 having a processor 102. Instructions and data to control operation of the processor 102 in accordance with the present disclosure are stored in a memory device 103 which is in data communication with the processor 102.

Typically, the gaming machine 100 will include both volatile and non-volatile memory devices and more than one of each type of memory devices, with such memory devices being collectively represented by the memory device 103.

Figure 5:
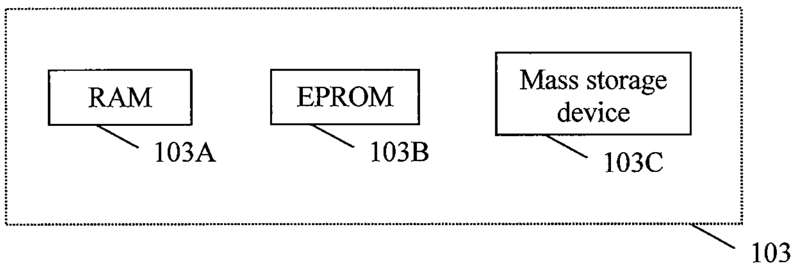
FIG. 5 is a schematic block diagram of components of a memory device of the gaming machine shown in FIG. 3.

FIG. 5 shows a block diagram of the main components of an exemplary memory device 103. The memory device 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

The gaming machine has hardware meters 104 for purposes including ensuring regulatory compliance and monitoring player credit, an input/output (I/O) interface 105 for communicating with a player interface 120 of the gaming machine 100, the player interface 120 having several peripheral devices. The input/output (I/O) interface 105 and/or the peripheral devices may be intelligent devices with their own memory for storing associated instructions and data for use with the input/output interface or the peripheral devices. A random number generator module 113 generates random numbers for use by the processor 102.

In the example shown in FIG. 4, the peripheral devices that communicate with the game controller 101 comprise one or more displays 106, a touch screen and/or bank of buttons 107, a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

It is also possible for the operative components of the gaming machine 100 to be distributed, for example input/output devices such as displays 106, buttons 107, card and/or ticket reader 108, printer 109, bill acceptor and/or coin input mechanism 110, coin output mechanism 111 may be provided remotely from the game controller 101.

Figure 6:
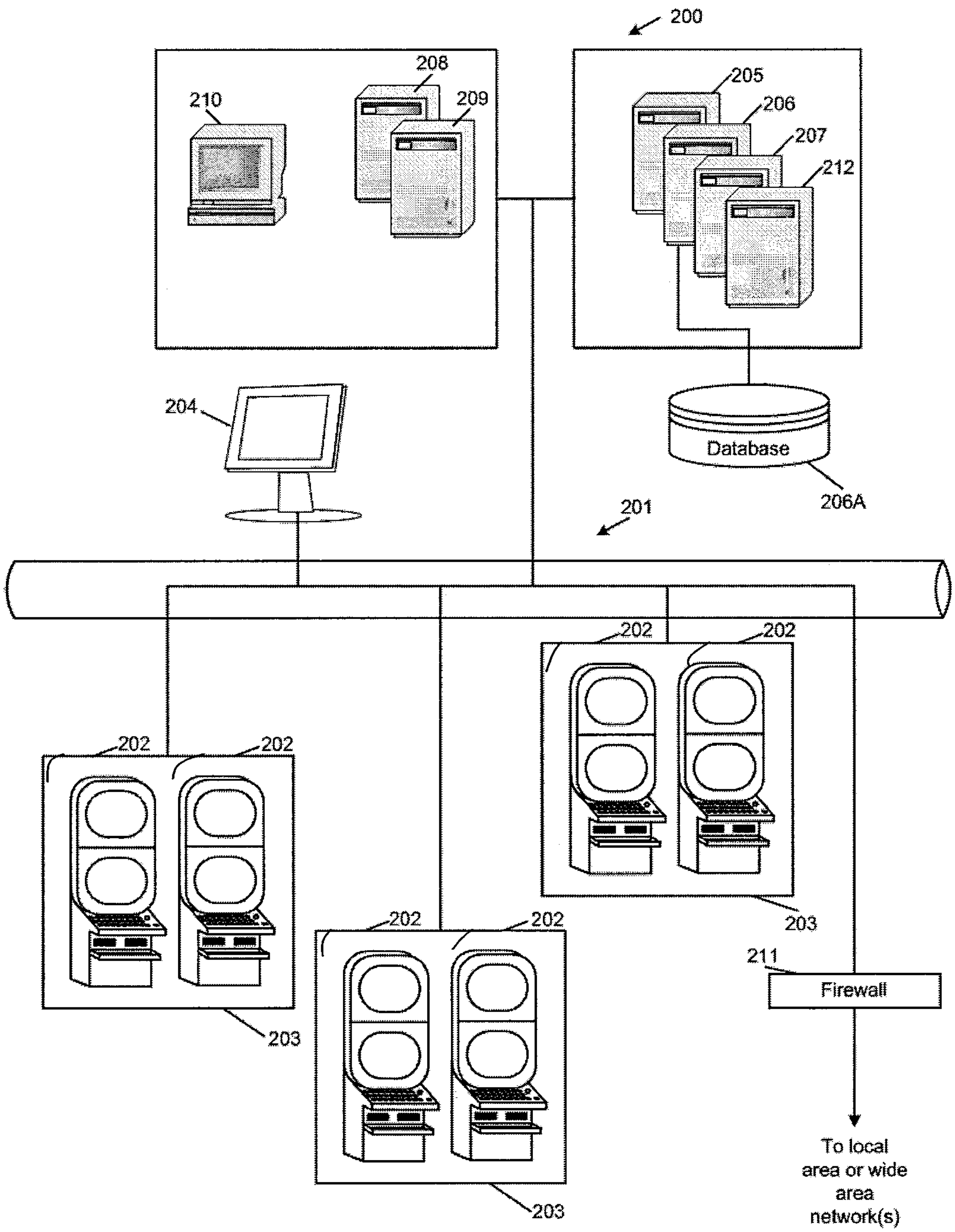
FIG. 6 is a schematic diagram of a gaming system in accordance with an alternative embodiment of the present disclosure wherein the gaming system is implemented over a network.

FIG. 6 shows a gaming system 200 in accordance with an alternative embodiment. The gaming system 200 includes a network 201, which for example may be an Ethernet network, a LAN or a WAN. In this example, three banks 203 of two gaming machines 202 are connected to the network 201. The gaming machines 202 provide a player operable interface and may be the same as the gaming system 10 shown in FIG. 3 and, or gaming machine 100 shown in FIG. 4, or may have simplified functionality depending on the requirements for implementing game play. While banks 203 of two gaming machines are illustrated in FIG. 6, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by the gaming machines 202 in a database 206A. Typically, if the gaming system enables players to participate in a Jackpot game, a Jackpot server 207 will be provided to monitor and carry out the Jackpot game.

In a variation of the above thick client embodiment, the gaming machine 202 may implement the game, with the game server 205 functioning merely to serve data indicative of a game to the gaming machine 202 for implementation.

With this implementation, a data signal containing a computer program usable by the client terminal to implement the gaming system may be transferred from the game server to the client terminal, for example in response to a request by the client terminal.

In a thin client embodiment, the game server 205 implements most or all of the game played by a player using a gaming machine 202 and the gaming machine 202 essentially provides only the player interface. With this embodiment, the game server 205 provides the game controller. The gaming machine will receive player instructions, and pass the instructions to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming system 200, including for example a gaming floor management server 208 and a licensing server 209 to monitor the use of licenses relating to particular games. An administrator terminal 210 is provided to allow an administrator to monitor the network 201 and the devices connected to the network.

The gaming system 200 may communicate with other gaming systems, other local networks such as a corporate network, and/or a wide area network such as the Internet, for example through a firewall 211.

A loyalty program server 212 may also be provided.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine. Alternatively, a separate random number generator server could be provided.

Examples of specific implementations of the gaming system will now be described in relation to a standalone gaming machine 50 although it will be understood that implementation may also be carried out using other gaming system architectures such as a network architecture of the type shown in FIG. 6.

In this example, the gaming system comprises five reels, each reel corresponding to a display position group having an associated set of display positions for displaying symbols.

The reels are arranged to display standard symbols and one or more function symbols and win outcomes are determined on the basis of the symbols visible at the display positions when the reels stop rotating.

Typically, a player will purchase or otherwise obtain win entitlements such as several win lines which are used in the game to determine win outcomes. If the displayed symbols on the reels have symbols associated with a winning combination such as a winning combination disposed on a win line, the player wins a prize.

The gaming system is operable in normal game mode and special game mode and may be arranged to commence special game mode when a predetermined game outcome occurs. Special game mode may comprise one or more free games. Special game mode may commence automatically on the basis of a game event occurring during a game such as display of a particular symbol, based on game outcomes determined by the gaming system, or may be prompted by a player pressing a button on the gaming system 10 after the player has identified that a game outcome corresponding to special game mode requirements has occurred.

The gaming system 10 may also be arranged so as to determine eligibility for special game mode, for example based on the amount or type of bet placed, based on particular time periods and so on.

Special game mode may also be arranged to commence when a special game is purchased by a player.

Figure 7:
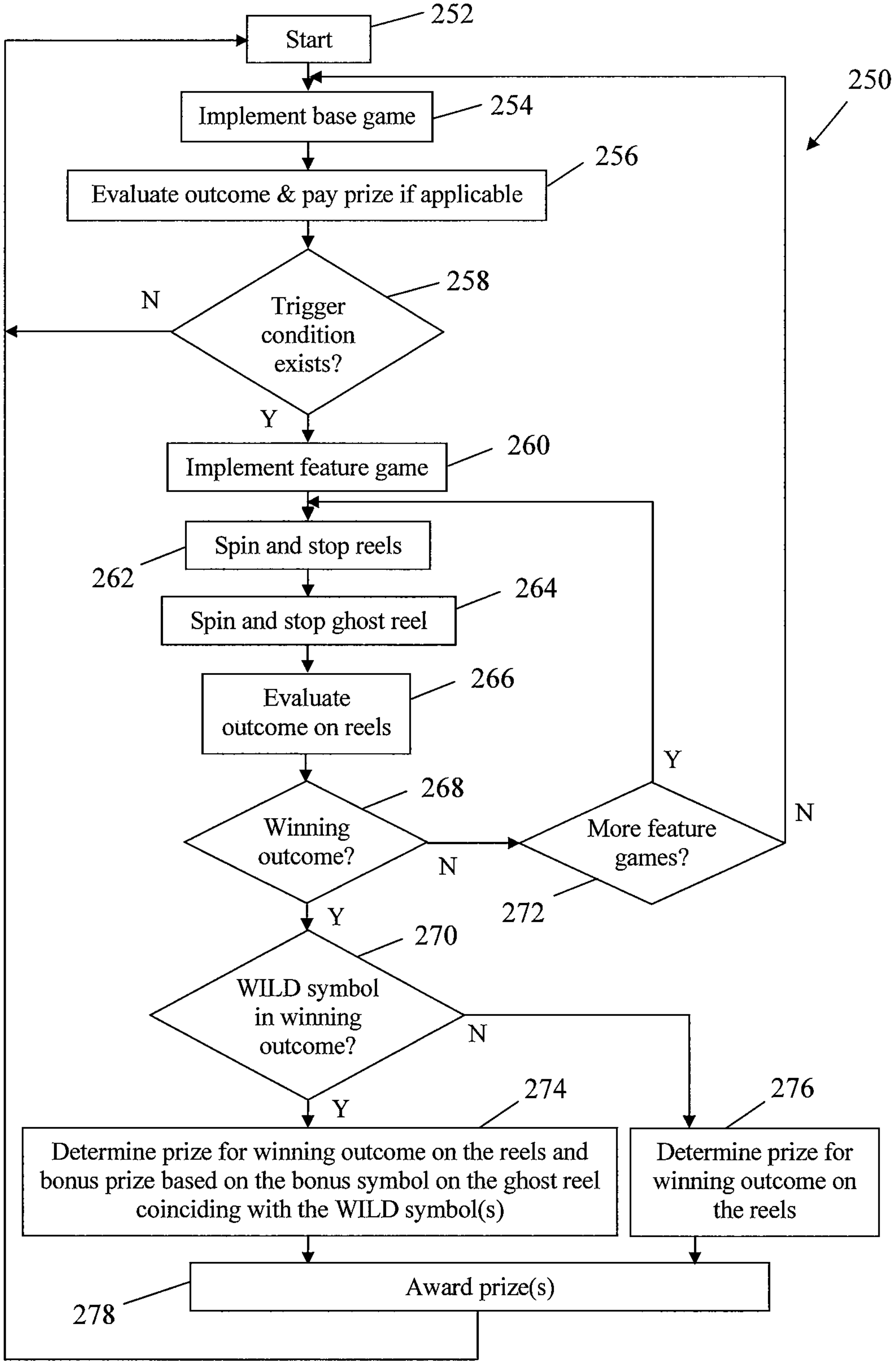
FIG. 7 is a flow diagram illustrating game play of a gaming system in accordance with an embodiment of the present disclosure.

A specific example will now be described in relation to flow diagram 250 shown in FIG. 7 which illustrates steps 252 to 278 of a method of gaming implemented by the gaming system according to the present embodiment.

Figure 9:
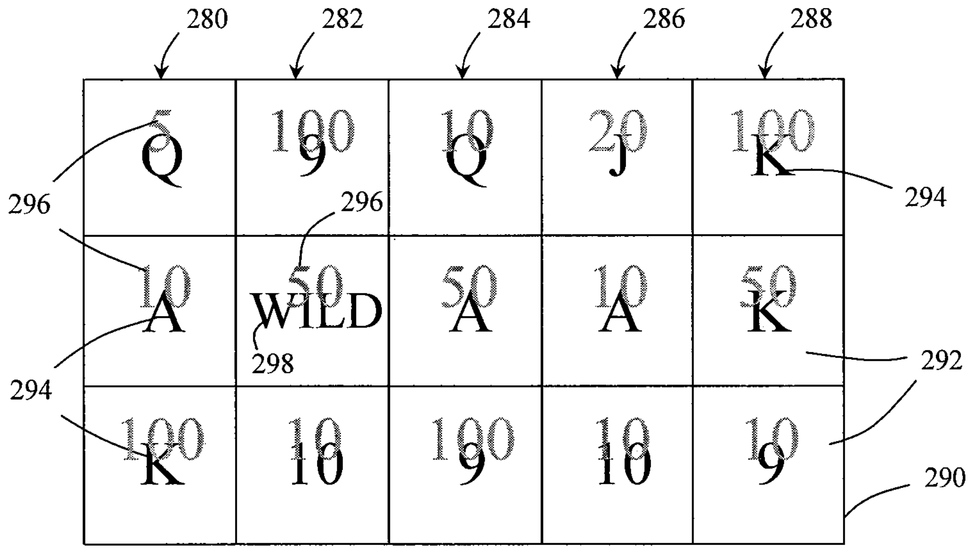
FIG. 9 is a diagrammatic representation of a screen displayed by a gaming system in accordance with an embodiment of the present disclosure.

In this example, five virtual reels 280, 282, 284, 286, 288 are provided and displayed on a graphical display device 54 in a display area 290, as shown in FIG. 9. Each reel 280, 282, 284, 286, 288 corresponds to a display position group, and each reel comprises three display positions 292 for displaying base symbols 294. It will be understood that any number of reels may be provided.

During implementation of a base game, the reels are spun and subsequently stopped at step 254 to show a plurality of symbols 294 in the display area 290.

Standard winning symbol combinations may include common poker game winning combinations such as three of a kind, four of a kind, straights, flushes etc. A standard symbol winning combination may be achieved if symbols that form part of the standard winning combination are displayed at defined display positions on the reels.

The outcome evaluator 28 determines at step 256 whether the symbols displayed at the display positions correspond to a winning outcome and, if a winning outcome exists, a prize associated with the winning outcome is awarded to the player. This determination at step 256 is made by comparing the symbols displayed at the display positions with a pay table or similar.

If a trigger condition exists at step 258, special game mode commences which causes implementation of a special feature at step 260. The special feature may include one or more feature games. In the present example, the trigger condition is display of one or more defined trigger symbols, although it will be understood that any trigger condition is envisaged.

During implementation of a feature game, as with the base game, the reels are spun and subsequently stopped at step 262 to show a plurality of symbols 294 in the display area 290. A "ghost reel" is then spun and subsequently stopped at step 264 to show a plurality of bonus symbols 296 in the display area 290 over the displayed base symbols 294. In this example the "ghost reel" is arranged so as to be semi-transparent such that the displayed base symbols 294 are visible behind the ghost reel and the bonus symbols 296 on the ghost reel are visible over the base symbols at step 264. As shown in FIG. 9, in this example each display position 292 includes both a base symbol 294 and a bonus symbol 296.

Figure 10:
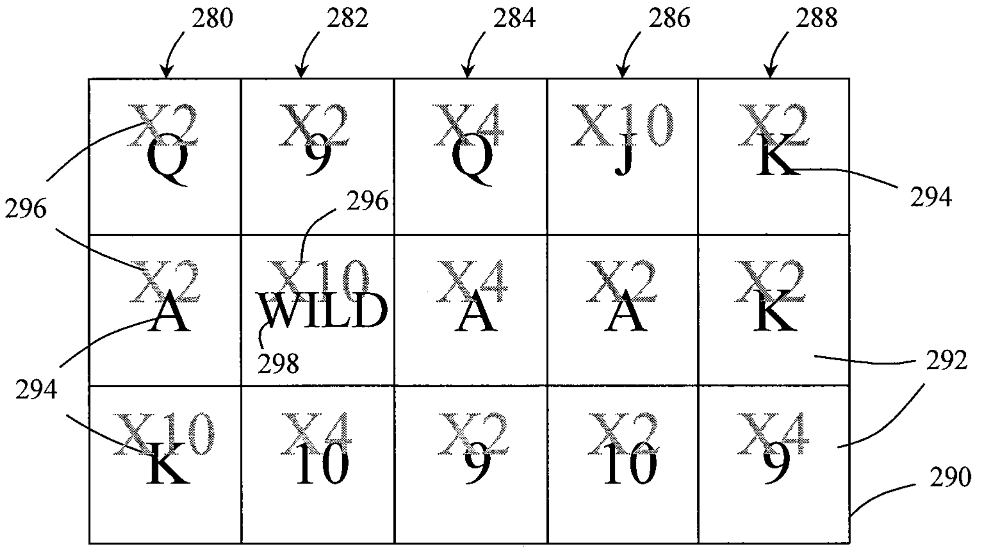
FIG. 10 is a diagrammatic representation of a screen displayed by a gaming system in accordance with a further embodiment of the present disclosure.

Each bonus symbol 296 in this example corresponds to a spot prize of a defined number of credits, including 5, 10, 20, 50 or 100 credits, although it will be understood that variations are possible. For example, as shown in FIG. 10, the bonus symbols 296 may be multipliers, including for example ×2, ×4 and ×10 multipliers, although it will be understood that other variations are possible including combinations of different types of bonus symbols.

An evaluation is made as to whether the displayed base symbols correspond to a winning combination at step 268, and if not, a subsequent feature game is played or a subsequent base game is played, depending on whether more feature games remain to be played.

If the evaluation determines that the displayed base symbols correspond to a winning combination at step 268, a determination is made by the special symbol determiner 25 as to whether the winning combination includes a defined special symbol, in this example a WILD symbol 298.

If the winning combination includes a defined special symbol, in this example a WILD symbol 298, a prize is determined at step 274 according to the winning combination and a bonus prize determined and awarded at step 278 according to the bonus symbol 296 displayed at the defined special symbol display position.

For example, as shown in FIG. 9, a winning outcome that includes 3 "Ace" symbols and a special WILD symbol 298 is displayed across a middle line, with a "50" bonus symbol 296 displayed in the same display position 292 as the special WILD symbol 298. In this example, a prize is awarded according to a 4 "Ace" symbol combination, plus a bonus spot prize of 50 credits.

In an alternative example, as shown in FIG. 10, a winning outcome that includes 3 "Ace" symbols and a special WILD symbol 298 is displayed across a middle line, with a "×10" bonus symbol 296 displayed in the same display position 292 as the special WILD symbol 298. In this example, a prize is awarded according to a 4 "Ace" symbol combination, plus a bonus prize that causes the prize for a combination of 4 "Aces" to be multiplied by 10.

If the winning combination does not include a defined special symbol, in this example a WILD symbol 298, a prize is determined at step 276 and is awarded at step 278 according to the winning combination alone.

Figure 8:
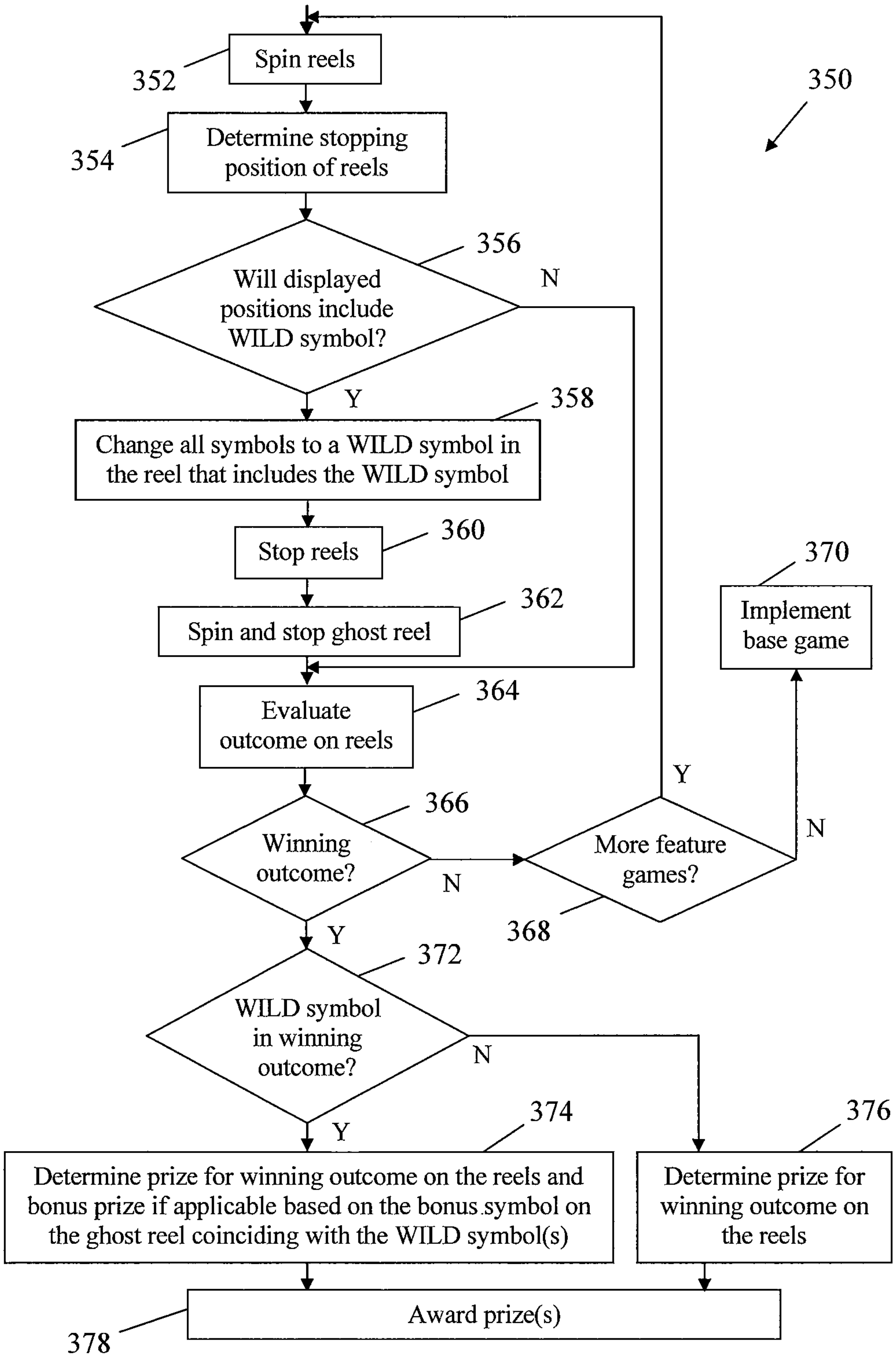
FIG. 8 is a flow diagram illustrating game play of a feature game of a gaming system in accordance with an alternative embodiment of the present disclosure.

A variation of this example will now be described in relation to FIG. 11 and flow diagram 350 shown in FIG. 8 which illustrates steps 352 to 378 of a method of gaming implemented by the gaming system according to the present embodiment. For ease of representation, only steps of a feature game are shown, although it will be understood that steps of a base game may be the same as the base game represented by the steps 252 to 258 shown in FIG. 7. Like and similar features are indicated with like reference numerals.

During implementation of a feature game, the reels are spun at step 352 and stopping positions of the reels determined at step 354. A determination is then made as to whether the displayed symbols will include a special symbol at step 356, in this example a WILD symbol, when the reels stop spinning.

If a special symbol will be displayed, all symbols on a reel that include the special symbol are changed at step 358 to a special symbol, in this example a WILD symbol, by the symbol expander 31, and the reels then stopped so as to display a symbol outcome including a reel with only special symbols.

A "ghost reel" is then spun and subsequently stopped at step 362 to show a plurality of bonus symbols 296 in the display area 290 over the displayed base symbols 294. In this example the "ghost reel" is arranged so as to be semi-transparent such that the displayed base symbols 294 are visible behind the ghost reel and the bonus symbols 296 on the ghost reel are visible over the base symbols at step 264. As shown in FIG. 11, each display position 292 includes both a base symbol 294 and a bonus symbol 296.

As with the embodiment shown in FIG. 9, each bonus symbol 296 corresponds to a spot prize of a defined number of credits, although it will be understood that variations are possible.

An evaluation is made as to whether the displayed base symbols correspond to a winning combination at step 366, and if not, a subsequent feature game is played or a subsequent base game is played, depending on whether more feature games remain to be played.

If the evaluation determines that the displayed base symbols correspond to a winning combination at step 366, a determination is made by the special symbol determiner 25 as to whether the winning combination includes a defined special symbol, in this example a WILD symbol 298.

If the winning combination includes a defined special symbol, in this example a WILD symbol 298, a prize is determined at step 374 according to the winning combination, and a bonus prize is determined and is awarded at step 378 according to the bonus symbol 296 displayed at the defined special symbol display position in the winning combination.

Figure 11:
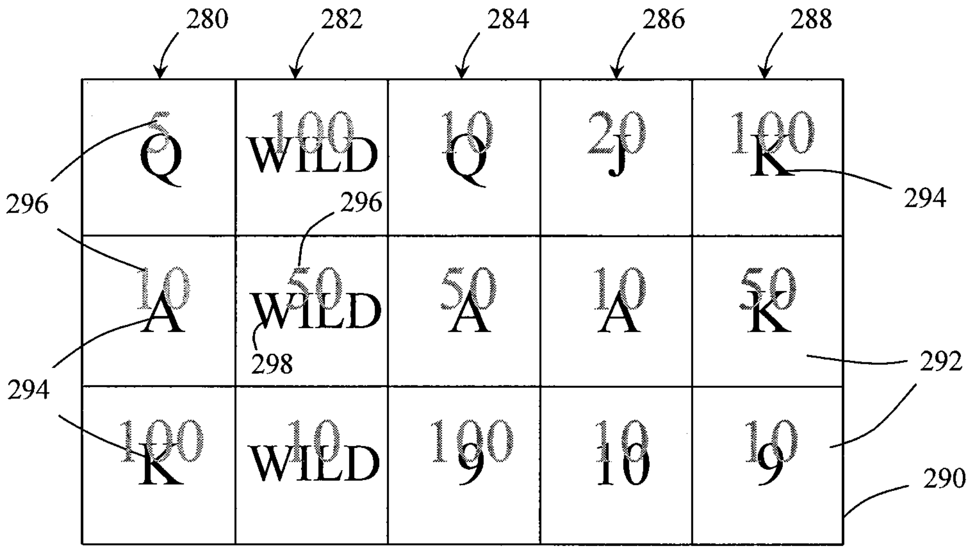
FIG. 11 is a diagrammatic representation of a screen displayed by a gaming system in accordance with an embodiment of the present disclosure represented by the flow diagram shown in FIG. 8.

For example, as shown in FIG. 11, a determination was made by the special symbol determiner 25 that the symbol outcome will include a special symbol, in this example a WILD symbol 298. In response to the determination, the symbol expander 31 changes all symbols on the relevant reel to special symbols, and the reels then stop spinning to display an outcome that includes 3 WILD symbols 298 on the second reel 282.

In this example, a winning outcome that includes 2 "Queen" symbols and a special WILD symbol 298, and a winning outcome that includes 3 "Ace" symbols and a special WILD symbol 298 are displayed across a top line and a middle line, with a "100" bonus symbol 296 displayed in the same display position 292 as the special WILD symbol 298 on the top line, and a "50" bonus symbol 296 displayed in the same display position 292 as the special WILD symbol 298 on the middle line. In this example, a prize is awarded according to a 3 "Queen" symbol combination and a 4 "Ace" symbol combination, plus bonus spot prizes of 50 and 100 credits.

A variation of the example shown in FIG. 11 will now be described in relation to FIG. 12. Like and similar features are indicated with like reference numerals.

As with the embodiment shown in FIG. 11, after a determination has been made by the special symbol determiner 25 that the symbol outcome will include a special symbol, in this example a WILD symbol 298, the symbol expander 31 changes all symbols on the relevant reel to special symbols. In addition, the symbol replicator 33 also changes all symbols on a different other reel to special symbols. The other reel may for example be selected pseudo-randomly or according to defined criteria.

The reels then stop spinning to display an outcome and the outcome is evaluated to determine whether one or more winning outcomes exist and whether a bonus prize should be awarded based on the bonus symbols displayed at the same symbol display positions as the special WILD symbols 298.

It will be understood however, that only the base symbols on the other reel have changed; the locations of the bonus symbols do not change.

Figure 12:
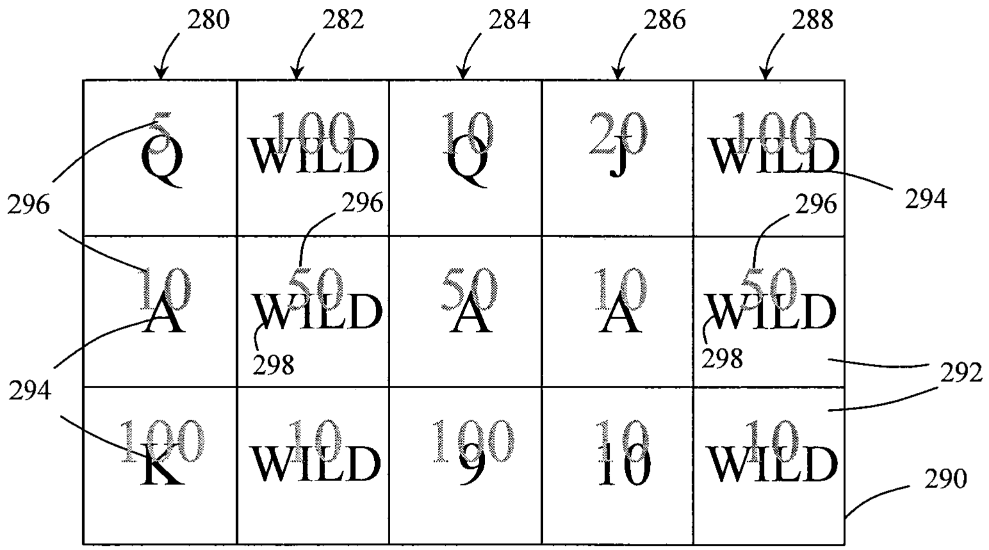
FIG. 12 is a diagrammatic representation of a screen displayed by a gaming system in accordance with a further embodiment of the present disclosure.

In the example shown in FIG. 12, a determination was made by the special symbol determiner 25 that the symbol outcome will include a special symbol, in this example a WILD symbol 298 in the second reel 282. In response to the determination, the symbol expander 31 changes all symbols on the second reel to WILD symbols 298. The symbol replicator 33 selects a different reel, in this example the fifth reel 288, and changes all symbols on the fifth reel 288 to WILD symbols 298. The reels then stop spinning to display an outcome that includes 2 "Queen" symbols and a special WILD symbol 298 across the top line, and a winning outcome that includes 3 "Ace" symbols and 2 special WILD symbols 298 across the middle line, with 1 "100" bonus symbol 296 displayed in the same display position 292 as the special WILD symbol 298 on the top line, and 2 "50" bonus symbols 296 displayed in the same display positions 292 as the special WILD symbols 298 on the middle line. In this example, a prize is awarded according to a 3 "Queen" combination and a 5 "Ace" symbol combination, plus bonus spot prizes of 50, 50 and 100 credits.

In a variation, the symbol replicator 33 only changes all symbols on a further reel to WILD symbols 298 if the symbol expander 31 has changed all symbols on the a defined reel to WILD symbols 298. The further reel may be pre-defined, defined according to defined criteria or randomly selected.

For example, the system may be arranged such that the first and fifth reels 280, 288 are defined such that if symbols on one of the first and fifth reels 280, 288 have been changed to WILD symbols by the symbol expander 31, the symbols on the other of the first and fifth reels 280, 288 are changed to WILD symbols.

In the claims which follow and in the preceding description of the disclosure, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the disclosure.

It is to be understood that, if any prior art is referred to herein, such reference does not constitute an admission that the prior art forms a part of the common general knowledge in the art, in Australia or any other country.

Modifications and variations as would be apparent to a skilled addressee are determined to be within the scope of the present disclosure.

What is claimed is:

1. A gaming system comprising:
- a display device operable to display a plurality of display positions; and
- a controller having a processor and memory device that stores a plurality of bonus reels, each having a set of bonus symbols, and a plurality of base reels, each having a set of base symbols, and a plurality of instructions, which, when executed, cause the processor to at least:
  - display a plurality of base symbols being selected for the plurality of display positions from the set of base symbols, respectively, based on a random number generated from a random number generator,
  - evaluate the plurality of base symbols selected for a special symbol being selected for a first base reel among the plurality of base reels,
  - responsive to the special symbol having been selected for a first display position in the first base reel, replace each of the plurality of base symbols on one base reel among the plurality of base reels with the special symbol, and display the plurality of base symbols selected for the plurality of display positions unoccupied by the special symbol and the special symbol selected for the one base reel,
  - display the plurality of base symbols in the plurality of base reels being evaluated for a winning combination,
  - display a first bonus reel selected from the plurality of bonus reels and a first bonus symbol selected from the set of bonus symbols in the first bonus reel selected,
  - display a first award responsive to the winning combination displaying both the special symbol selected coinciding with the first bonus symbol, and
  - display a second award responsive to the winning combination not including the special symbol.

2. The gaming system of claim 1, wherein the instructions further cause the processor to randomly select the one base reel.

3. The gaming system of claim 1, wherein the one base reel is the first base reel.

4. The gaming system of claim 1, wherein the first bonus symbol includes at least one of a prize multiplier and a spot credit award.

5. The gaming system of claim 4, wherein the instructions further cause the processor to multiply the first award determined when the prize multiplier is displayed at the first display position.

6. The gaming system of claim 1, wherein the instructions further cause the processor to overlay at least one of the plurality of base symbols displayed with the first bonus symbol.

7. The gaming system of claim 1, wherein the instructions further cause the processor to replace each of the plurality of base symbols on a second base reel among the plurality of base reels with the special symbol.

8. A method of operating a gaming device having a display device having a processor and memory device that stores a plurality of bonus reels, each having a set of bonus symbols, and a plurality of base reels, each having a set of base symbols, the method comprising:

controlling a plurality of display positions to display a plurality of base symbols selected from the set of base symbols based on a random number generated from a random number generator;

responsive to a special symbol having been selected for a first display position for a first base reel among the plurality of base reels, changing each of the plurality of base symbols on one base reel among the plurality of base reels to the special symbol, and displaying the plurality of base symbols selected for the plurality of display positions unoccupied by the special symbol and the special symbol selected for the one base reel;

controlling the display device to display the plurality of base symbols including any special symbol selected in the plurality of base reels being evaluated for a winning combination;

controlling the display device to display a first bonus reel selected from the plurality of bonus reels and a first bonus symbol selected from the set of bonus symbols in the first bonus reel selected; and controlling the display device to display a first award responsive to the special symbol in the winning combination coinciding with the first bonus symbol, and a second award responsive to the winning combination not including the special symbol.

9. The method of claim 8, further comprising selecting the one base reel randomly or the first base reel as the one base reel.

10. The method of claim 8, wherein the first bonus symbol includes at least one of a prize multiplier and a spot credit award.

11. The method of claim 10, further comprising multiplying the first award determined when the prize multiplier is displayed at the first display position.

12. The method of claim 8, further comprising overlaying at least one of the plurality of base symbols displayed with the first bonus symbol.

13. The method of claim 8, further comprising replacing each of the plurality of base symbols on a second base reel among the plurality of base reels with the special symbol.

14. A non-transitory computer-readable medium comprising instructions, which, when executed, cause a processor to perform the steps of:

controlling a display device to display a plurality of base reels being spun;

controlling the display device to display at a plurality of display positions associated with the plurality of base reels being spun a plurality of base symbols selected from a set of base symbols based on a random number generated from a random number generator;

responsive to a special symbol having been selected for a first display position for a first base reel among the plurality of base reels, changing each of the plurality of base symbols on one base reel among the plurality of base reels with the special symbol, and controlling the display device to display the plurality of base symbols selected for the plurality of display positions unoccupied by the special symbol and the special symbol selected for the one base reel;

selecting a first bonus reel from a plurality of bonus reels;

selecting a first bonus symbol from a set of bonus symbols for the first bonus reel selected;

controlling the display device to display a first award if at least one of the plurality of display positions in a winning combination displays both the special symbol coinciding with the first bonus symbol; and controlling the display device to display a second award if the winning combination does not include the special symbol.

15. The non-transitory computer-readable medium of claim 14, wherein the instructions, when executed, further cause the processor to perform the step of randomly selecting the one base reel.

16. The non-transitory computer-readable medium of claim 14, wherein the instructions, when executed, further cause the processor to perform the step of selecting the first base reel as the one base reel.

17. The non-transitory computer-readable medium of claim 16, wherein the first bonus symbol includes at least one of a prize multiplier and a spot credit award.

18. The non-transitory computer-readable medium of claim 17, wherein the instructions, when executed, further cause the processor to perform the step of multiplying the first award determined when the prize multiplier is displayed at the first display position.

19. The non-transitory computer-readable medium of claim 14, wherein the instructions, when executed, further cause the processor to perform the step of controlling the display device to overlay at least one of the plurality of base symbols displayed with the first bonus symbol.

20. The non-transitory computer-readable medium of claim 14, wherein the instructions, when executed, further cause the processor to perform the step of replacing each of the plurality of base symbols on a second base reel among the plurality of base reels with the special symbol.

* * * * *